United States Patent
Dash et al.

(10) Patent No.: US 10,127,124 B1
(45) Date of Patent: *Nov. 13, 2018

(54) PERFORMING FENCING OPERATIONS IN MULTI-NODE DISTRIBUTED STORAGE SYSTEMS

(71) Applicant: Veritas Technologies LLC, Mountain View, CA (US)

(72) Inventors: Prasanta R. Dash, San Jose, CA (US); Amarinder Singh Randhawa, Sunnyvale, CA (US); Asmita Jagtap, Pune (IN); Chaitanya Yalamanchili, Santa Clara, CA (US); Madhav Buddhi, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 14/867,516

(22) Filed: Sep. 28, 2015

Related U.S. Application Data

(63) Continuation of application No. 13/667,693, filed on Nov. 2, 2012, now Pat. No. 9,146,790.

(51) Int. Cl.
*G06F 11/00* (2006.01)
*G06F 11/20* (2006.01)
*H04L 29/08* (2006.01)

(52) U.S. Cl.
CPC ...... *G06F 11/2069* (2013.01); *H04L 67/1097* (2013.01); *G06F 2201/805* (2013.01); *G06F 2201/85* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,661,050 | B2* | 2/2010 | Huben | G01B 31/318385 714/724 |
| 7,792,977 | B1* | 9/2010 | Brower | G06F 9/468 709/229 |
| 8,108,715 | B1* | 1/2012 | Agarwal | G06F 11/0709 714/10 |
| 9,098,392 | B1* | 8/2015 | Gadiraju | G06F 11/2023 |
| 9,146,790 | B1* | 9/2015 | Dash | G06F 11/00 |
| 2002/0188590 | A1* | 12/2002 | Curran | G06F 3/0622 |
| 2007/0022314 | A1* | 1/2007 | Erasani | G06F 11/1425 714/4.1 |

(Continued)

*Primary Examiner* — Amine Riad
(74) *Attorney, Agent, or Firm* — Campbell Stephenson LLP

(57) ABSTRACT

Various systems and methods for managing node connectivity in distributed storage systems are disclosed. For example, one method involves detecting a communication fault between two nodes. A first node is configured to communicate input/output (I/O) requests to the second node as in-flight I/O requests. The second node is configured to communicate locally generated I/O requests and the received I/O requests to storage devices. Once the communication fault is detected, a fencing operation is performed. The fencing operation can include processing some of the received I/O requests by the second node, and rejecting any additional in-flight I/O requests received from the first node.

20 Claims, 11 Drawing Sheets

(56) References Cited

U.S. PATENT DOCUMENTS

| | | | |
|---|---|---|---|
| 2011/0179231 A1* | 7/2011 | Roush | G06F 3/0622 711/152 |
| 2014/0025991 A1* | 1/2014 | Anandavally | G06F 11/0793 714/10 |
| 2015/0309892 A1* | 10/2015 | Ramasubramaniam | G06F 11/2005 714/4.5 |
| 2016/0315800 A1* | 10/2016 | AlShaikh | G01V 1/28 |

* cited by examiner

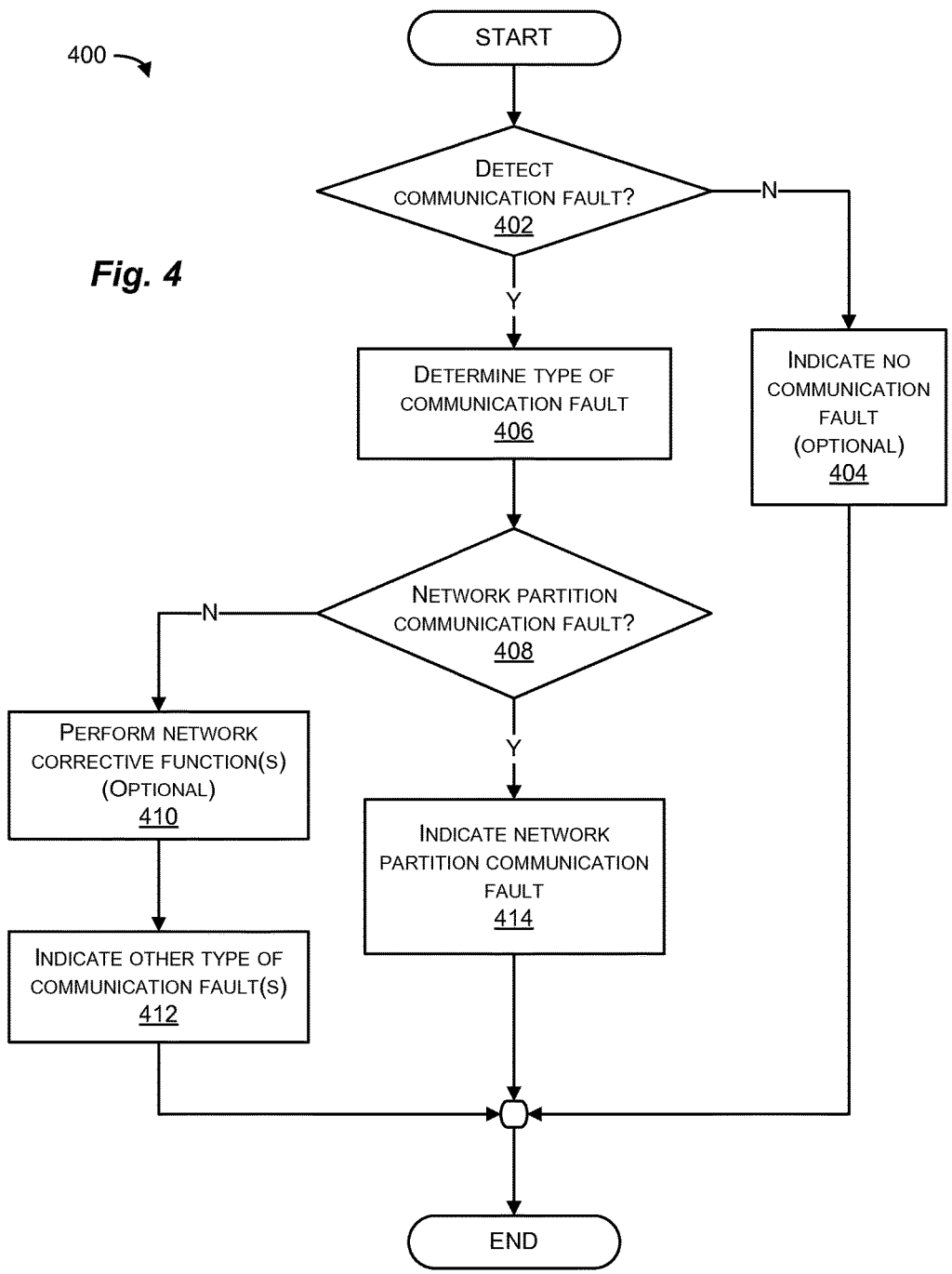

PERFORMING FENCING OPERATIONS IN MULTI-NODE DISTRIBUTED STORAGE SYSTEMS

CROSS-REFERENCE TO RELATED APPLICATIONS

The present patent application is a continuation of U.S. patent application Ser. No. 13/667,693, filed on Nov. 2, 2012, entitled "Performing Fencing Operations In Multi-Node Distributed Storage Systems" and is incorporated by reference herein in its entirety and for all purposes as if completely and fully set forth herein.

BACKGROUND OF THE INVENTION

Field of the Invention

This application related to distributed storage systems. Particularly, this application relates to performing fencing operations in multi-node distributed storage systems.

Description of the Related Art

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. Storage area networks (SANs) including hundreds of storage devices can be used to provide storage for hosts.

SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices.

BRIEF DESCRIPTION OF THE DRAWINGS

The embodiments of the present application may be better understood, and its numerous objects, features, and advantages made apparent to those skilled in the art by referencing the accompanying drawings.

FIG. 4 is a flowchart of a method illustrating fault detection as used by a fencing mechanism, according to some embodiments.

Figure 1:
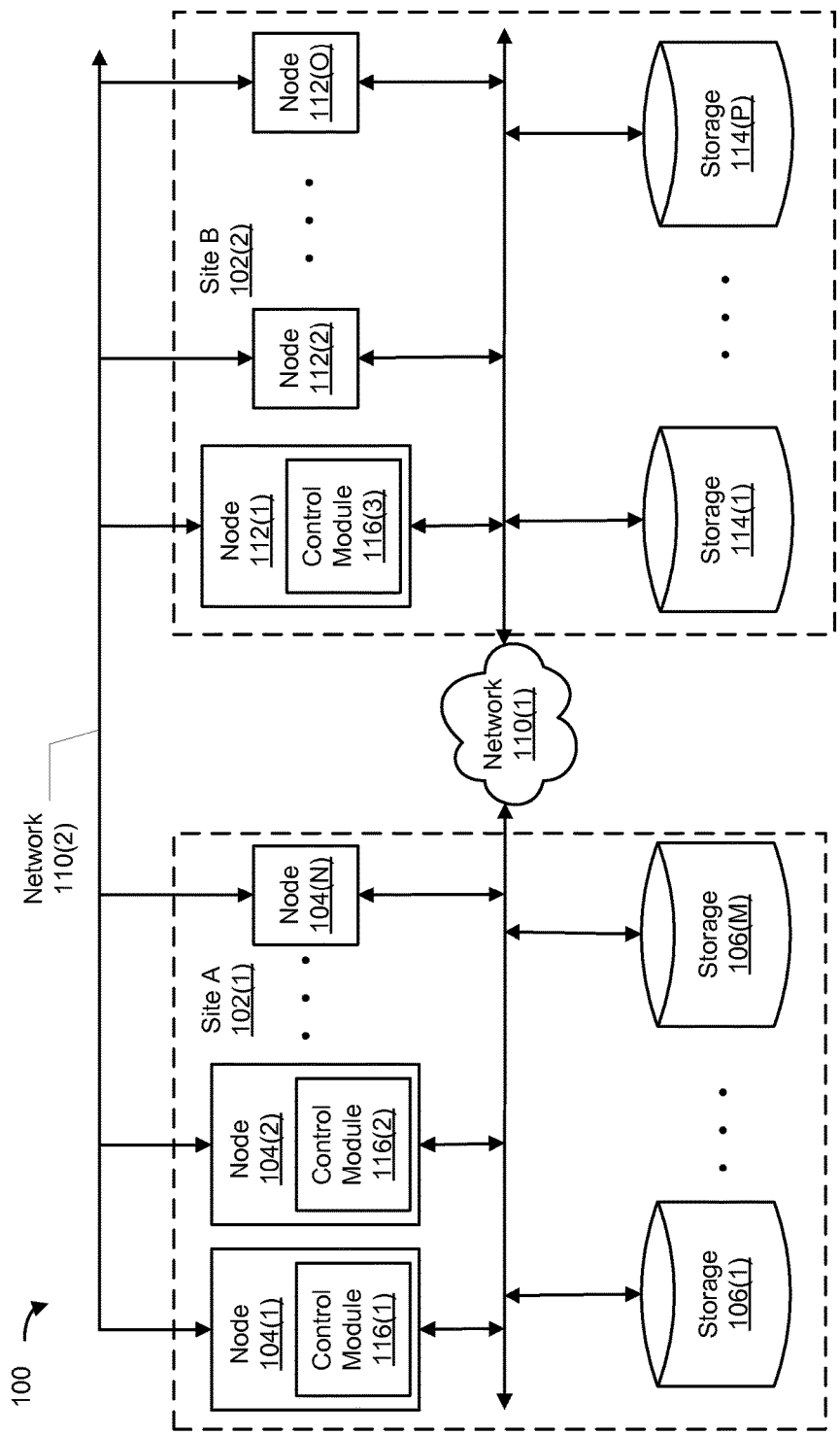
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to managing node connectivity of a distributed storage system (such as shown in FIG. 1). Node connectivity management includes fencing, i.e., preventing data modification by nodes that are no longer part of an active cluster. The distributed storage system can include multiple sites, and it can implement any one (or more) of a variety of storage access, backup, archiving, and/or redundancy operations, among others. The multiple sites can be connected together, such as using a network. Each site can include one or more nodes that form a communication cluster. One or more of these nodes includes a control module that can manage these data operations. The nodes (e.g., application(s) executing on these nodes) issue input/output (I/O) requests (e.g., data reads, data writes, etc.) to access storage device(s). Some of the I/O requests are issued directly by each node, such as to access the storage devices (also referred to as local I/O). Some of the I/O requests are issued indirectly, such as by using another node as a proxy. A proxy node would receive I/O requests from a node. I/O requests that are in the process of being sent (e.g., in transit) from a node to a proxy node are referred to as in-flight I/O. Once the in-flight I/O is received by the proxy node, it is referred to as remote I/O. The proxy node would then issue these remote I/O requests to the storage device(s).

In event that communication between the nodes fails, such as when a portion of the network fails during a network partition, each of two or more groups of nodes can determine that the other group of nodes has failed (or might have failed). For example, a race can occur between the two (or more) groups of nodes, with control modules of each group of nodes determining that the other group of nodes is malfunctioning. Node(s) in a first group can perform data writes to the storage device(s), while node(s) in the other group can also perform data writes to the same portion(s) of the shared storage devices, resulting in data inconsistency errors. In order to prevent these data inconsistency errors, an arbitration process is performed that determines winner and loser groups. Nodes in the winner group are determined to keep communicating with the storage devices, whereas nodes in the loser group are determined to stop communicating with these storage devices. However, nodes in the winner group do not determine if or when nodes in the loser group(s) will conclude that they have lost arbitration (and thus desist from using the storage devices). Thus, in addition to this arbitration process, the control module of the winner group of node(s) may perform a fencing process that fences nodes from the loser group(s) from the rest of the distributed storage system. The fencing process is performed to ensure that nodes from the loser group(s) do not communicate with the storage devices, as improper data writes from the loser nodes would cause various data inconsistency and other errors.

The fencing process can be performed in two stages. In the first stage, the fencing process attempts to fence out the loser group(s) of nodes. The loser nodes can be notified about the outcome of the arbitration and/or about the fencing process being implemented. Such notification can include the control module(s) of the loser group of nodes discovering that the loser group lost the arbitration process; the control module(s) of the loser group of nodes encountering communication errors that indicate loss of communication; and/or communication from the loser nodes being disabled, among others. In the second stage, the fencing process removes loser nodes' access to the storage devices, such as by instructing the storage devices (that are accessible to the winner group) to not accept any communication from the loser nodes. In this case, even if the control module(s) of the winner group of nodes cannot ensure that loser group(s) of nodes are no longer performing data writes to the shared storage devices (such as by executing instance(s) of a shared application), the loser nodes will not be able to access/modify application data being used by winner nodes. In effect, this fencing mechanism prevents a portion of the communication cluster from accessing the storage devices in uncoordinated manner. The control module can also prevent proxy nodes (from the winner group) from processing in-flight I/O requests issued by nodes in the loser group.

FIG. 1 is a block diagram illustrating a distributed storage system 100 that includes a collection of nodes and storage. System 100 includes two sites, site A 102(1) and site B 102(2), although distributed storage system 100 can be easily expanded to have additional or fewer sites, as desired. Site A 102(1) includes nodes 104(1)-104(N), and site B 102(2) includes nodes 112(1)-112(N). Each of nodes 104(1)-104(N) and/or 112(1)-112(N) can be accessed by clients (not shown), such as over a network 110(1) and/or 110(2). Each network 110(1)-110(2) can also include one or more routers, hubs, and/or other network elements (not shown), as desired.

A collection of nodes form a cluster and communicate to one or more storage devices. Nodes 104(1)-104(N) access storage devices 106(1)-106(M) of the same site (site A 102(1)) and/or storage devices 114(1)-114(P) of another site (site B 102(2)). Similarly, nodes 112(1)-112(O) access storage devices 114(1)-114(P) of the same site (site B 102(2)) and/or storage devices 106(1)-106(M) of another site (site A 102(1)). Nodes 104(1)-104(N)/112(1)-112(O) access storage devices 106(1)-106(M)/114(1)-114(P) to perform various data operations, such as to read, write, backup, and/or archive data, among others. Nodes 104(1)-104(N) include one or more control modules, such as control modules 116(1) and 116(2). Similarly, nodes 112(1)-112(O) include one or more control modules, such as control module 116(3). Each such control module can manage operation of node(s), such as nodes of the same cluster or site.

A node accesses storage device(s) by issuing input/output (I/O) requests. For example, nodes can execute parallel applications. Each instance of such parallel application can issue I/O requests to the same storage device(s). The instances of parallel applications typically coordinate write I/O accesses to the same storage device(s), such that data consistency is maintained. These I/O requests can thus be issued by each such application, which is also referred to herein as being issued by each node (such as if each node executes an instance of a parallel application). The I/O requests can be issued directly from each node (also referred to as local I/O) to the storage devices, and/or indirectly (also referred to as remote I/O), such as by using another node as a proxy.

The node acting as a proxy (also referred to herein as a proxy node) evaluates these remote I/Os and communicates these to the storage device(s). In some embodiments, a proxy node acts as an intermediary for I/O requests issued by an originating node. The originating node (e.g., an instance of a parallel application) sends the remote I/O requests to the proxy node for a variety of reasons, such as if the originating node does not have direct access to the storage devices. The proxy node can coordinate issuance of I/O requests from remote node(s), as well as local I/O requests, to the storage device(s), etc. The proxy node would then process (e.g. issue) the remote I/O requests to the storage devices.

In case a communication failure is detected (e.g., a network partition condition is detected), the cluster can be divided into at least two groups of nodes that have limited or no connectivity between each other. A network partition can occur when one group of nodes loses communication with another group of nodes. Through an arbitration process, such as a resource race and/or a quorum disk process, a group of nodes (or one node) are determined to be winner node(s), and the remaining group(s) of nodes (or one node) are determined to be loser node(s). For example, a network partition condition can be detected between a group of nodes including node 104(1) and a group of nodes including node 104(2). It is noted that until the fencing process is completed, control module(s) of each group of nodes (e.g., control module 116(1) of one group of nodes and control module 116(2) of the other group of nodes) could consider their respective node group to be a potential winner group and the other node group(s) to be the potential loser group(s). Arbitration process for different groups can start and/or finish at different times, thus at the point in time when one group has declared itself winner, other group(s) may not have yet concluded that they are the loser group(s), and thus could still continue to perform I/O to the storage devices. In other words, even though the arbitration process is complete, all of the loser nodes may not conform to the winner/loser designation. In addition, there can be some in-flight I/O requests from the loser nodes in transit, which should be discarded by any proxy nodes in the winner group.

A fencing process is started with respect to loser node(s), i.e., node(s) that are being fenced out of the cluster. A control module 116(1) of the winner node group fences out the loser node(s) from the rest of the distributed storage system. In effect, this fencing mechanism prevents the loser node(s) from accessing the storage devices and/or other common resources. Control module 116(1) also prevents any proxy nodes from performing remote I/O accesses issued by the loser node(s). In one embodiment, control module 116(1) causes (i.e., by permitting) the proxy nodes to complete at least some (or all) of the remote I/Os already received from the loser node(s). For example, control module 116(1) can cause (i.e., by permitting) the proxy nodes to complete at least some of the remote I/Os already received from the loser node(s).

For example, nodes 104(1)-104(N) accesses storage devices 106(1)-106(M). Node 104(2) can use node 104(1) as a proxy, meaning that node 104(2) (e.g., an instance of an application on node 104(2)) issues I/O requests (i.e., remote I/O requests for accessing storage devices 106(1)-106(M)) to node 104(1). Node 104(1) issues these remote I/O requests, as well as locally generated (e.g., by a local instance of an application) I/O requests, to storage devices 106(1)-106(M). For example, node 104(2) can encounter a storage connectivity issue, and thus forwards I/O request(s) to node 104(1). At a later point in time, a network partition can occur, e.g., where the two nodes 104(1) and 104(2) can't fully communicate with each other. Once the network partition is detected, then the arbitration process (e.g., as described with reference to FIG. 5) can determine node 104(1) to be a part of the winner node group, whereas node 104(2) is determined to be in a losing group. Nodes within the winning group can have limited communication with nodes in the losing group. In this example, node 104(2) (in the losing group) can continue to send I/O requests to node 104(1) in the winning group.

As part of this fencing process, control module 116(1) causes nodes in the winner group to stop processing any additional remote I/O requests from loser node 104(2). As part of the fencing process, control module 116(1) and/or storage devices 106(1)-106(M) can also de-register loser node 104(2), such that storage devices 106(1)-106(M) ignore I/O requests received directly by loser node 104(2). However, in some embodiments, fenced-out node 104(2) still issues I/O requests to the proxy node (e.g., node 104(1)). The proxy node(s) can still include multiple remote I/O requests received from loser node(s) that have not yet been issued.

In order to prevent the proxy node(s) from issuing remote I/O request(s) from the loser node(s) to the storage devices, control module 116(1) can also require the proxy node(s) (e.g., node 104(1)) to not process I/O requests from node 104(2). In one embodiment, the proxy node can process already received remote I/O requests from the loser nodes. The proxy node would discard any additional in-flight I/O requests received from the loser node(s). In one embodiment, once each node in the winner group processes all of the remote I/O requests, that node can indicate that the fencing process is locally done on that node. Once all of the nodes in the winner group indicate that local fencing process is finished, then the control module(s) for that winner group can indicate that a global fencing process is finished. In other words, the fencing operation is complete when all nodes in the winner group complete in-progress remote I/O requests and commit to discard future in-flight and remote I/O requests.

Storage devices 106 and/or storage devices 114 can be accessed as a shared storage device, such as a cluster shared volume. For example, storage devices 106(1)-106(M) can be implemented as a collection of hard disk drives aggregated to form at least one volume accessible for read and write operations by nodes 104(1)-104(N) and 112(1)-112(O). According to some embodiments, storage devices 106 and/or storage devices 114 can be formatted using a virtual machine file system (VMFS), or a similar file system that can be used by multiple virtual machines. Virtual machines can perform I/O reads and writes to storage devices 106 and/or storage devices 114, such as to read and write data.

Nodes of site B 102(2) can be used for providing data protection and/or back-up for applications and/or virtual machines of site A 102(1), i.e., by using any one of various data protection/back-up techniques. Typically, each node 104(1)-104(N) and/or 112(1)-112(O) can be implemented using a server, including one or more processors, memory, bus, etc. One example implementation of such a server is described below with reference to FIG. 8. Network 110(1)-110(2) can be implemented as any one or more wired and/or wireless networks, including any combination of a local area network (LAN), and/or a storage area network (SAN), etc.

Figure 2:
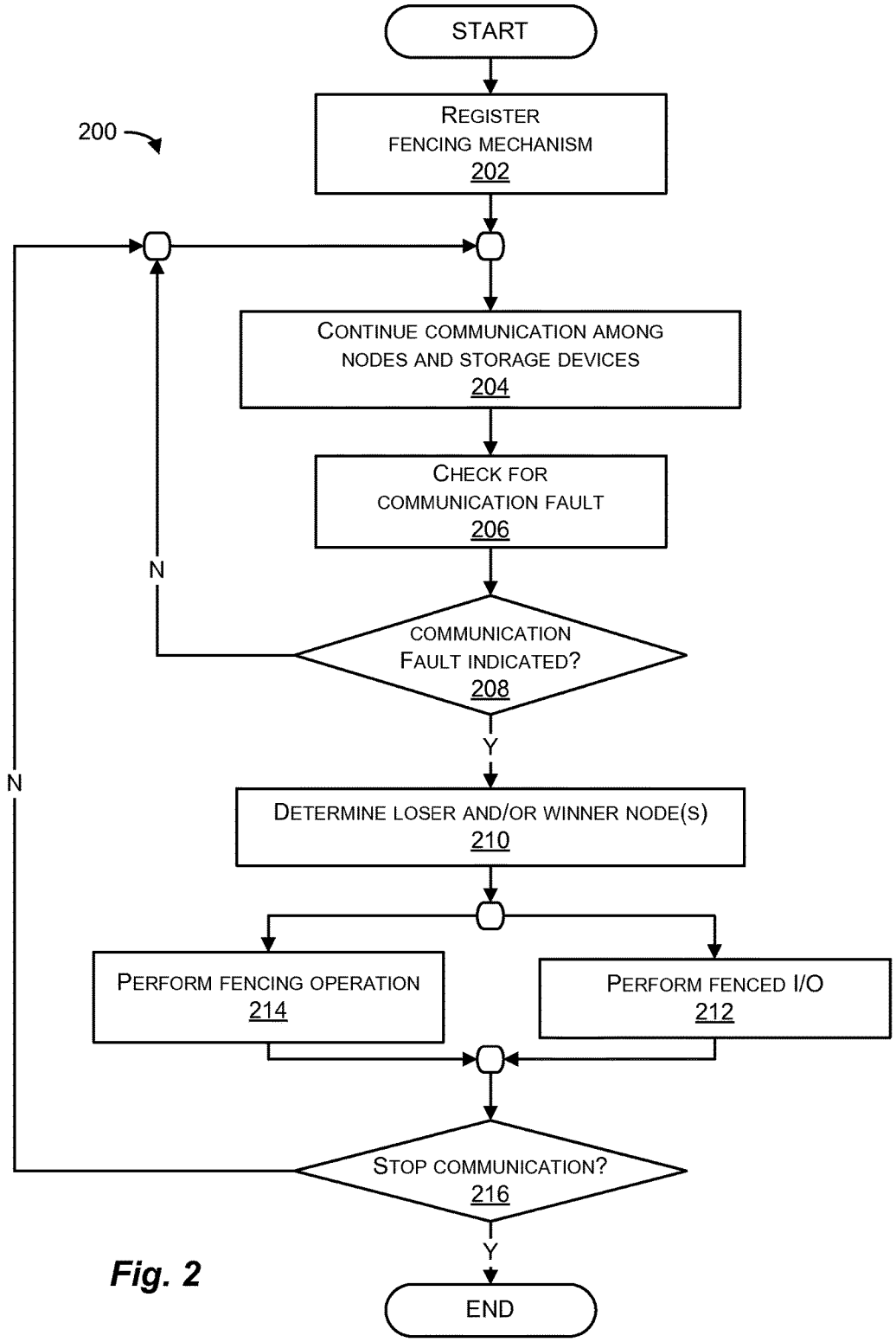
FIG. 2 is a flowchart of a method illustrating operation of a fencing mechanism, according to some embodiments.

FIG. 2 illustrates a method 200 for generation of node connectivity information, according to one embodiment. As will be appreciated in light of the present disclosure, this method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, at least portions of method 200 are executed by the nodes of FIG. 1, such as by control module 116(1).

In element 202, a fencing mechanism is registered, according to one embodiment. The registration of the fencing mechanism can be implemented in various ways. In one embodiment, registration includes registering the nodes with the storage devices, such as by using keys. The storage devices could then only accept I/O requests from nodes with registered keys. However, other techniques that specify which nodes are allowed and/or denied access to the storage devices are contemplated. One or more of the nodes can also communicate, to one or more control modules, information that indicates which nodes can be used as proxy nodes to issue remote I/O that originated with another node(s).

In element 204, the nodes communicate among each other and/or storage devices, according to one embodiment. For example, instances of applications (such as of parallel applications) issue I/O requests to the storage devices. Some nodes (e.g., application instances) issue in-flight I/O requests to proxy node(s).

In element 206, the control module checks for communication fault(s) in the distributed storage system, according to one embodiment. For example, control module 116 determines whether there are certain communication fault(s), such as a network partition (e.g., a network split-brain), or other type of fault. In some embodiments, the control module receives one or more communication fault indications from the nodes and/or administrative modules of the distributed storage system. The control module then determines the type or/or source of the communication fault, i.e., by checking for existence of certain communication faults, based on the received communication fault indications. One implementation of element 206 (e.g., as performed by the control module) is described in more detail below with reference to FIG. 4. In some implementations, the nodes perform a heartbeat operation with other nodes to determine if there has been a communication fault.

In element 208, the control module determines whether a certain communication fault is indicated, according to one embodiment. For example, control module 116 determines whether element 206 indicates that a certain type (e.g., a network partition) of communication fault has occurred. If the certain communication fault(s) have occurred (e.g., such as a network partition), element 210 is performed next. If the certain communication fault(s) have not occurred, element 204 is performed next.

In element 210, one or more loser and/or winner nodes are determined, according to some embodiments. Through an arbitration process, such as a resource race and/or a quorum disk process, a group of nodes (or one node) are determined to be winner node(s), and the remaining group(s) of nodes (or one node) are determined to be loser node(s). The control module(s) of each group of nodes (i.e., that are separated by a network partition) can perform this arbitration. The winner nodes continue to participate in communication in the distributed storage system. The loser nodes are to be fenced-off from participating in the communication. In some embodiments, elements 212 and 214 may be executed substantially in parallel. However, one or more parts of each of elements 212 or 214 can be executed before the other element, as desired. One implementation of element 210 is described in more detail below with reference to FIG. 5.

In element 212, the control module performs fenced I/O, according to some embodiments. Fenced I/O refers to I/O requests (e.g., remote I/O) that are issued by proxy nodes on behalf of fenced out nodes. In one implementation, the control module instructs each winner node how to process various I/O. For example, the control module can instruct the winner node(s) to process remote I/O requests that are already received. In one implementation, the control module instructs the winner node(s) to reject all, or most, of any remote I/O requests received after the determination of the loser nodes. In another implementation, the control module instructs the winner node(s) to reject in-flight I/O requests from the loser node(s) at some pre-determined point of the fencing process (e.g., start of the fencing process, end of the fencing process, or at another point of the fencing process, etc.). One implementation of element 212 is described in more detail below with reference to FIG. 6.

In element 214, the control module performs fencing operation with regard to the loser node(s), according to one or more embodiments. In one implementation, the control module facilitates the fencing operation with respect to the loser node(s). For example, the control module can de-register keys of the loser nodes with the storage devices. One implementation of element 214 is described in more detail below with reference to FIG. 7.

In element 216, the control module determines whether communication among nodes and storage devices should be stopped, according to one embodiment. If the communication should continue, element 204 is performed next. If the communication should stop, method 200 stops.

Figure 3A:
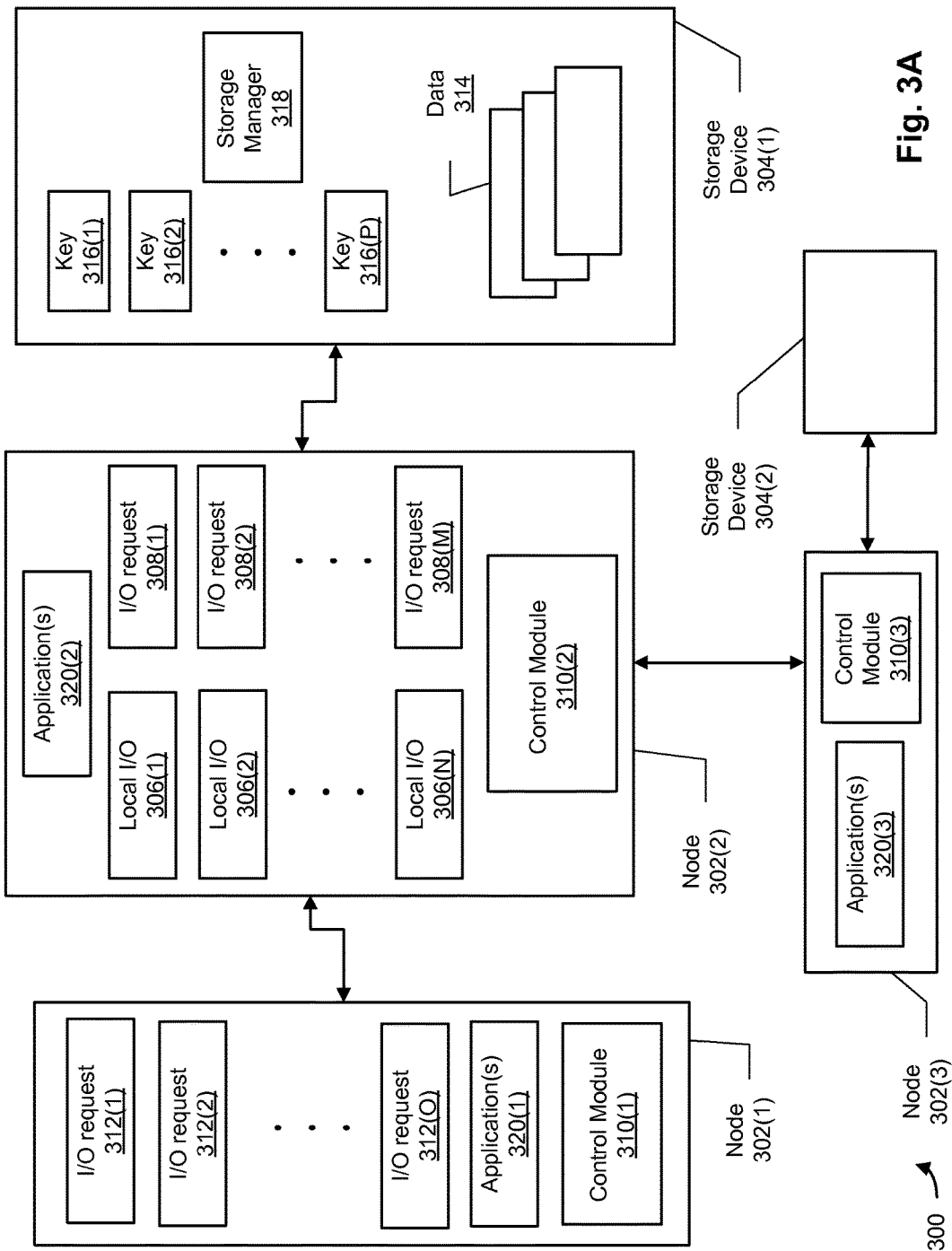
FIG. 3A is a block diagram illustrating various nodes and storage device of a distributed storage system, according to some embodiments.

FIG. 3A is a block diagram 300 illustrating various nodes and storage device of a distributed storage system, according to some embodiments. FIG. 3A illustrates a distributed storage system with nodes 302(1)-302(3) and storage devices 304(1) and 304(2). It is noted that the distributed storage system can include additional nodes and/or storage devices, and FIG. 3 is shown for explanatory purposes only. Each of nodes 302(1)-302(3) can include one or more processors, communication element(s), and memory. As described above with reference to FIG. 8, memory of at least one of the nodes can store at least a portion of a control module, such as control module 310(1)-310(3), which is executable by processor(s). FIG. 3 illustrates connectivity between node 302(2) and nodes 302(1) and 302(3). It is noted that this connectivity is exemplary only, and each of these nodes can be additionally connected, such as by using redundant networks, e.g., as shown by network 110(2) of FIG. 1, among others. It is noted that storage devices 304(1) and 304(2) can represent a disk group, and as such, can include multiple physical enclosures each containing multiple disks. In a communication cluster that includes nodes 302(1)-302(3), each node can access at least a portion of storage devices 304(2) and 304(2).

Node 302(1) includes a control module 302(1) and one or more applications 320(1). Application(s) 320(1) generate multiple I/O requests, such as I/O requests 312(1)-312(O). In one implementation, one or more of I/O requests 312(1)-312(O) are communicated to node 302(2) as in-flight I/O requests. Node 302(1) may not have direct connectivity/communication with storage device 304(1). Instead, node 302(1) communicates the in-flight I/O requests to node 302(2), i.e., to use node 302(2) as a proxy node. Node 302(2) would then issue these remote I/O requests (i.e., received in-flight I/O) to storage device(s), i.e., storage device 304(1). As described in examples above, in case of a communication fault, such as a network partition between nodes 302(1) and 302(2), node 302(1) may be determined to be a loser node, and then be fenced-off from communication with storage device 304(1).

Node 302(2) includes a control module 310(2) and one or more applications 320(2). Similarly, node 302(3) includes a control module 310(3) and one or more applications 320(3). Application(s) 320(2) generate multiple I/O requests, such as I/O requests 306(1)-306(N), which can be referred to as local I/O requests. Node 302(2) can also receive various in-flight I/O requests from one or more nodes, e.g., from node 302(1) and/or node 302(3), such as generated by respective applications 320(1) and/or 320(3). These in-flight I/O requests can be stored by node 302(2), e.g., as remote I/O requests 308(1)-308(M). Node 302(2) can issue, such as by using control module 310, both local I/O and remote I/O requests. When issuing remote I/O requests to storage device 304(1), node 302(2) acts as a proxy node for node 302(1) that originally issued these remote I/O requests.

As described in examples above, in case of a communication fault, such as network partition, once a node (e.g., node 302(1)) is determined to be a loser node, control module 310(2) (and/or a control module of another node, such as control module 310(3) of node 302(3)) can initiate the fencing operation and also cause node 302(2) (and/or other proxy nodes) to perform fenced I/O. As part of the fencing operation, any remote I/O from the loser node(s) that is already received can be communicated to the intended storage device (i.e., storage device 304(1)). Furthermore, any additional in-flight I/O received from the loser node(s) (i.e., node(s) that are either fenced out or in the process of being fenced out) are not accepted. Any in-flight I/O that is received from nodes that are indicated to stay in the communication cluster (e.g., the winner node(s)) are both accepted and issued to the intended storage device(s) by the proxy node(s). In one implementation, any remote I/O from the loser node(s) already received, but issued by the loser node(s) after a certain time during the fencing process, is not communicated to the intended storage device.

In summary, a winner proxy node will process any outstanding/in-progress remote I/O requests from loser node(s). However, this proxy node will not perform any additional I/O on behalf of a fenced-out node, and instead will discard any such additional in-flight I/O received from loser node(s). This proxy node will wait to complete outstanding I/Os before reporting a local completion of the fencing operation. It is noted that once all nodes in the winner group report (e.g., to a central manager module) that their respective local fencing operations are completed, the global fencing process is completed.

Control module 310(2) (and/or a control module of another node, such as control module 310(3) of node 302(3)) can also de-register the loser node(s), such as by communicating with storage devices 304(1) and 304(2) to deregister key(s) associated with the loser node(s) (e.g., key 316(2) associated with loser node 302(1)). In summary, the fencing process ejects/deletes keys of the loser nodes from the storage devices, completes any received remote I/O requests from the loser/fenced out nodes, and prevents any additional in-flight I/O requests received from the loser/fenced out nodes to be completed.

Storage device 304 includes data 314, keys 316(1)-316 (P), a storage manager 318, and data. Storage manager 318 is executable by one or more processors (not shown), and can manage the operation of storage device 304(1). Data 314 can include data that is accessed (e.g., by nodes 302(1)-302 (3)) by I/O requests, such as read/write I/O requests. Keys 316(1)-316(P) can indicate nodes of the distributed storage system that are registered to communicate with storage device 304(1).

Figure 3B:
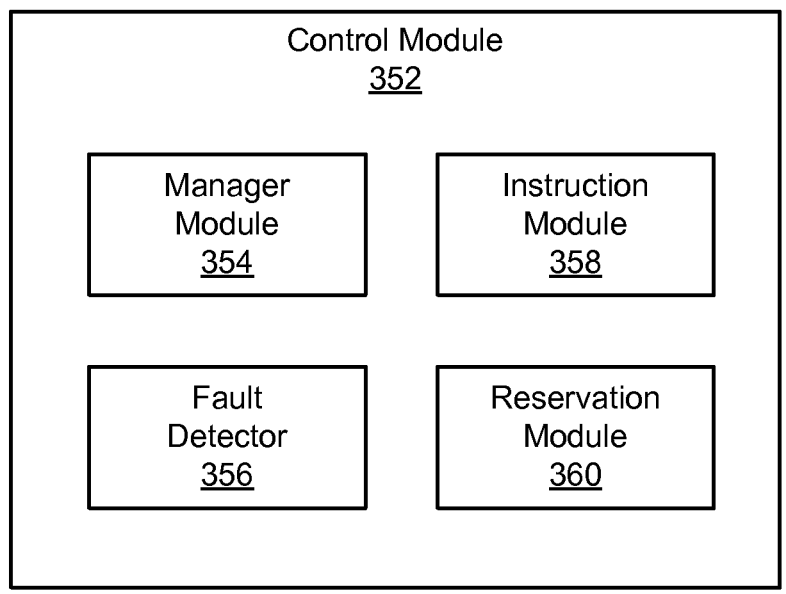
FIG. 3B is a block diagram illustrating an example of control module of a node of a distributed storage system, according to one embodiment.

FIG. 3B is a block diagram 350 of a control module 352, such as control module 116 and/or control module 310(1)- 310(3), according to one embodiment. Control module 352 includes a manager module 354, an instruction module 358, a fault detector 356, and/or a reservation module 360. It is noted that is some embodiments, one or more of these elements may be combined. For example, manager module 354 can be combined with instruction module 358. It is noted that one or more of modules of control module 352 may be implemented as a software and/or hardware modules. It is also noted that in some embodiments one or more of elements of control module 352 may not be used. Example operation of these modules is described below with reference to FIGS. 4-7.

FIG. 4 is a flowchart of a method 400 illustrating fault detection as used by a fencing mechanism, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIGS. 1, 3A, and 3B. In one embodiment, method 400 is executed by a control module, such as control module 116 and/or control module 310(1)- 310(3). In one embodiment, method 400 is executed by a fault detector, such as fault detector 356 of control module 352. In one embodiment, method 400 is a detailed view of element 206.

In element 402, a control module determines whether a communication fault occurred, according to one embodiment. The control module can receive communication fault indication(s) from the nodes and/or administrative modules of the distributed storage system. These fault indications can be implemented in various ways, such as interrupts, messages, broadcasts, heartbeat messages, etc. The fault indications can indicate characteristics of the communication fault, such as the type and/or source of the communication fault. If the control module does not detect any communication faults, element 404 is performed next. In element 404, the control module indicates that no communication fault occurred. In one implementation, the control module may simply do nothing (e.g., refrain from indicating a communication fault). If the control module detects a communication fault, element 406 is performed next.

In element 406, the control module determines a type of the communication fault, according to one embodiment. For example, the control module can then determine the type or/or source of the communication fault, i.e., by checking for existence of certain communication faults, based on the received communication fault indications.

In element 408, the control module determines whether a certain communication fault occurred, according to one embodiment. In one implementation, the control module determines whether a network partition occurred, i.e., where groups of nodes cannot fully communicate with each other. It is noted that although elements 408 and 414 indicate existence of a network partition, other types of communication faults can be detected instead, such as a storage split-brain, a network disconnect fault, and/or other communication faults that occur in distributed storage systems. If the control module does not detect a certain communication fault, such as the network partition, optional element 410 and element 412 are performed next. If the control module detects the certain communication fault, element 414 is performed next.

In element 410, optionally, the control module can perform network corrective functions, according to one embodiment. For example, the control module can initiate an error handler for fixing a communication fault. In element 412, the control module indicates that other type (e.g., not a certain fault such as a network partition fault) has occurred. In element 414, the control module indicates that the network partition (or other type of a certain communication fault) has occurred. It is noted that if method 400 is implemented by a fault detector, then the indications of elements 404, 412, and/or 414 are generated by a fault detector. The fault detector can communicate these indications to a manager module (e.g., manager module 354). Method 400 then concludes.

Figure 5:
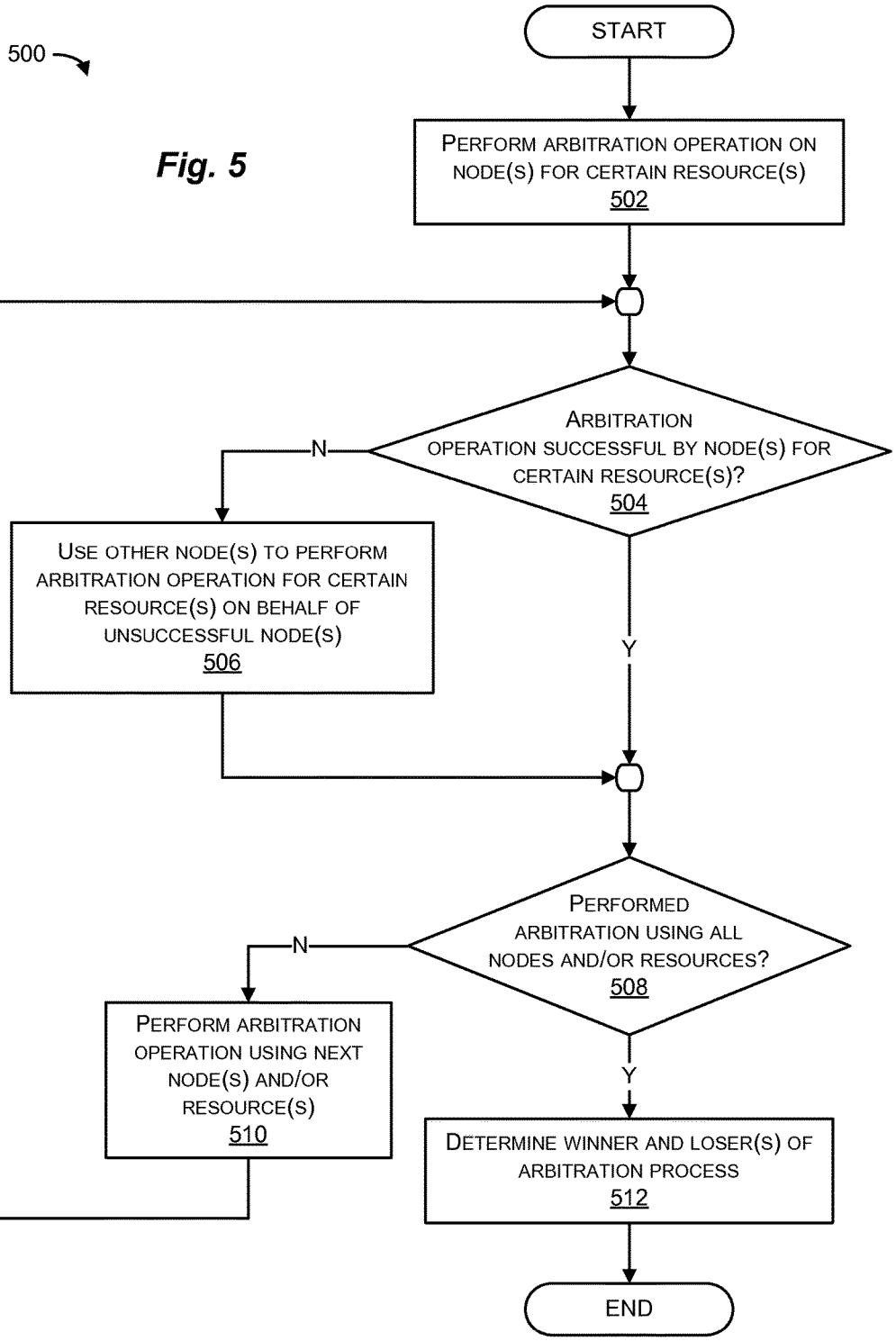
FIG. 5 is a flowchart of a method illustrating an example arbitration process, according to some embodiments.

FIG. 5 is a flowchart of a method 500 illustrating an example arbitration process, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1, 3A, and 3B. In one embodiment, method 500 is executed by a control module, such as control module 116 and/or control module 310(1)- 310(3).

In one embodiment, method 500 is executed by a reservation module, such as reservation module 360 of control module 352 of each group. Specifically, in case of a network partition, method 500 is executed by control module(s) of nodes in each of the groups of nodes, where the node groups are not able to communicate with each other. In one embodiment, method 500 is a detailed view of element 210. Method 500 illustrates an arbitration process where winner and loser node group(s) are determined, such as when a communication cluster is divided/partitioned as a result of a communication fault. As will be appreciated in light of the present disclosure, however, other techniques can be used instead. Method 500 describes an arbitration process where each group of nodes attempts to acquire resources. During arbitration, the nodes where a majority of the resources are obtained are declared the winner nodes, whereas node(s) of the other partitions are declared to be the loser nodes.

In element 502, a control module of a certain node performs arbitration operation on that node for certain resources, according to one or more embodiments. The control node can attempt to acquire access rights for one or more of resources (e.g., as indicated by the arbitration process). For example, the control module for node 104(1) can attempt to gain access rights to storage device 106(1). The actual implementation of gaining access rights can be implemented in one of various ways, such as storing a node/group signature with the storage device and/or another entity, among others. However, the access rights can be granted to the requesting node if some other partition (e.g., group of nodes, such as node 104(2) from another partition) has not already claimed ownership of that resource.

In element 504, the control module determines whether the arbitration process is successful with respect to the storage device(s), according to one embodiment. For example, control module 116(1) determines whether arbitration by node 104(1) is successful with regard to storage device 106(1). If the arbitration operation is successful, element 508 is performed next. If the arbitration is not successful, element 506 is performed next.

In element 506, the control module uses one or more other node(s) in the current partition to perform the arbitration operation on behalf of the unsuccessful node, according to one embodiment. With reference to the above example, control module of another node (e.g., in the same partition as node 104(1)) attempts to perform the arbitration operation (e.g., acquire access rights to storage device 106(1)) on behalf of the unsuccessful node (e.g., node 104(1)).

In element 508, the control module determines whether the arbitration process is successful with respect to all nodes in the current partition and/or resources accessible to these nodes, according to one embodiment. If arbitration is performed for all nodes and resources, element 512 is performed next. Otherwise, element 510 is performed next. In element 510, the arbitration operation described by element 502 is performed using the next resource (e.g., next storage device) and/or using the next node in the current partition. For example, the arbitration operation can be performed by another node that is in the same partition as node 104(1). The arbitration operation can also be performed for another storage device.

In element 512, the control module of the current partition can determine the winner and loser(s) of arbitration, according to one or more embodiments. For example, control module 116(1) of node 104(1) in the first partition can determine that node 104(1) (and other nodes in that partition) is in the winner group, as further explained below. Control module 116(1) would also determine that node 104(2) (and other nodes in that partition) is in the loser group. Control module(s) of nodes in other partition(s) (e.g., partition of node 104(2)) determine (i.e., by performing method 500) that the other partition(s) are in the loser groups(s).

As noted above, method 500 can be executed by at least one node in each network partition. In the example arbitration process describe above, nodes in each partition attempt to acquire exclusive ownership to a majority of mutually agreed upon resources (such as storage devices). If it is indicated to nodes in a second partition (e.g., a second group) that these resources are "owned" by nodes in a first partition (e.g., a first group), then nodes in the second partition would not determine to be winners. With regard to the flowchart 500, for a network partition scenario, a control module of a node in a first partition thus does not determine winner/loser status for nodes in other partitions. Within the same network partition, all nodes are determined as either loser or winner nodes. As a result, the nodes can acquire needed resources either collectively or by any one node in that partition.

Figure 6:
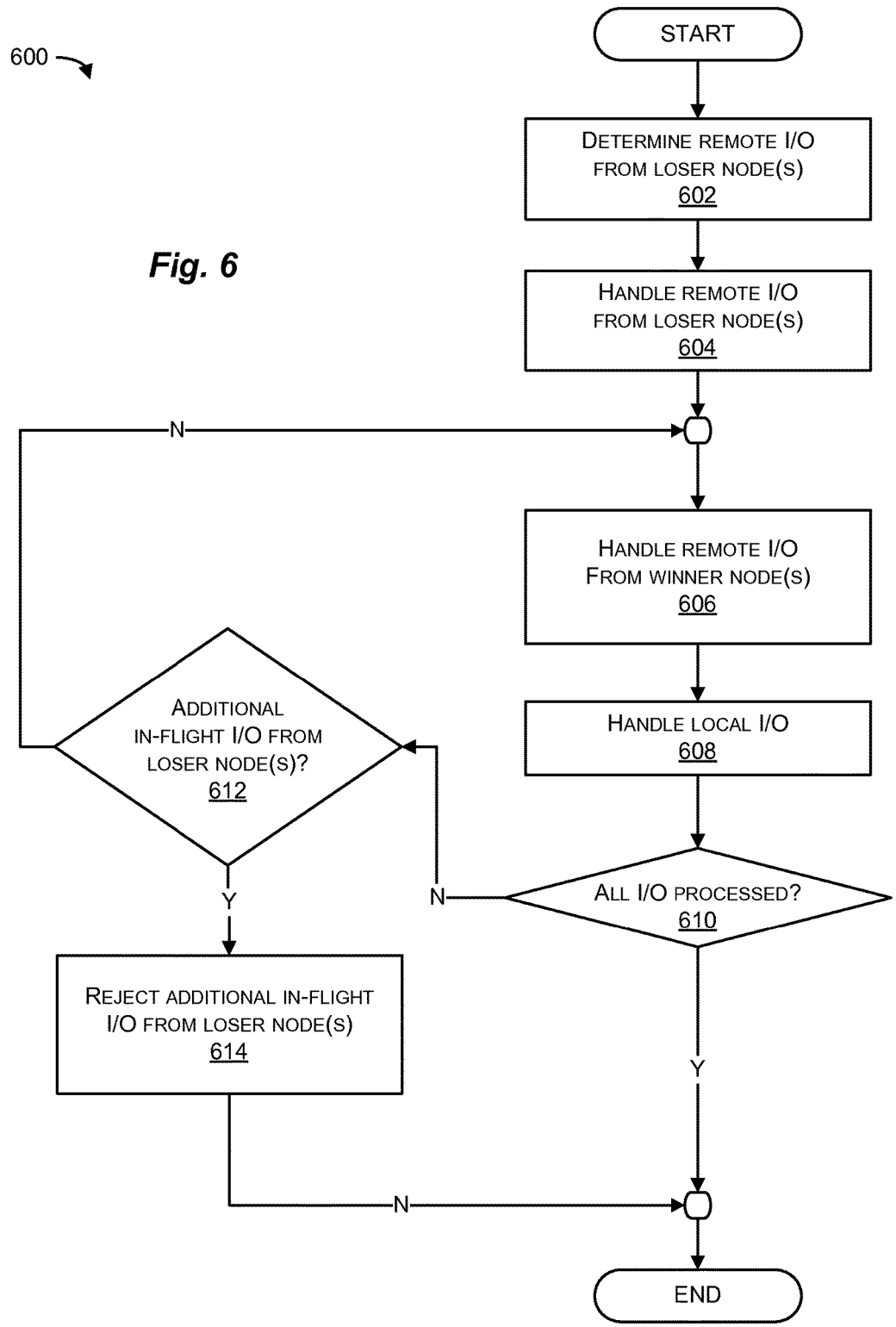
FIG. 6 is a flowchart of a method illustrating processing of various I/O requests by node(s) as part of the fencing mechanism, according to some embodiments.

FIG. 6 is a flowchart of a method 600 illustrating processing of various I/O requests by node(s) as part of the fencing mechanism, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600 is described with reference to variations of the elements described in connection with FIGS. 1, 3A, and 3B. In one embodiment, method 600 is executed by a control module, such as control module 116 and/or control module 310(1)-310(3). In one embodiment, method 600 is executed by a manager module and/or instruction module, such as manager module 354 and instruction module 358, respectively, of control module 352. In one embodiment, method 600 is a detailed view of element 212. In one implementation, method 600 is performed by a control module of a proxy node that was determined to be a winner of a fencing process.

In element 602, a control module determines remote I/O requests received from loser nodes(s), according to one embodiment. For example, the control module determines, e.g., for a node acting as a proxy for other node(s), the remote I/O requests received from nodes determined to be loser node(s). It is noted that each such proxy node can also include remote I/O requests from the winner nodes.

In element 604, the control module handles the remote I/O requests received from loser nodes(s), according to one embodiment. For example, the control module causes the proxy node(s) to issue substantially all of the remote I/O requests that have been received by the proxy node(s). In one implementation, the remote I/O requests that have been received as of a predetermined point in time of the fencing process are issued. In one embodiment, the control module communicates one or more instructions to the proxy nodes, such as by using an instruction module. The instruction(s) can contain commands, indications, code, etc., that cause the proxy node(s) to process the remote I/O requests.

In element 606, remote I/O requests from winner nodes are handled, according to one or more embodiments. For example, the control module can instruct the node(s) to issue remote I/O requests received from the winner nodes. In element 608, local I/O requests generated by winner nodes are handled, according to one or more embodiments. For example, the control module can instruct node(s) in the winner group to issue local I/O requests from the winner nodes. It is noted that in one embodiment, the winner nodes issue these local and remote I/O requests from the winner nodes without receiving any additional instructions from the control module.

In element 610, a determination is made as to whether all the I/O requests are processed. If all of the I/O requests (e.g., of a certain winner node) are processed, then method 600 ends. If there are more I/O requests remaining, element 612 is performed next. In element 612, a determination is made as to whether there are additional in-flight I/Os from the loser node(s). If additional in-flight I/O requests are received from the loser node(s), element 614 is performed next. Otherwise, element 606 is performed next.

In element 614, the control module causes the proxy node to reject any additional in-flight I/O requests that are received from the loser node(s). The control module can send instructions/indications (e.g., indicating this rejection) to the winner proxy node(s). The control module can also instruct the winner proxy node(s) to ignore (e.g., not accept, receive, and/or store) any additional I/O requests from the loser node(s), e.g., until the loser node(s) register back into the communication cluster. Next, if all of the I/O requests are processed, then method 600 ends. If there are more I/O requests remaining, element 606 is performed next.

Thus, in one implementation, proxy node only processes already received remote I/O requests from loser nodes. Once these remote I/Os from the loser nodes are complete, each proxy node can indicate that the indirect I/O fencing process is complete. In one embodiment, once all proxy nodes indicate the fencing process to be complete, then the control module (for that winning group) can indicate that the indirect I/O fencing process is complete for the winning group. Once the fencing process is initiated for the winning partition, the proxy node(s) from the winning group can then discard any additional in-flight I/O requests from these loser node(s).

Figure 7:
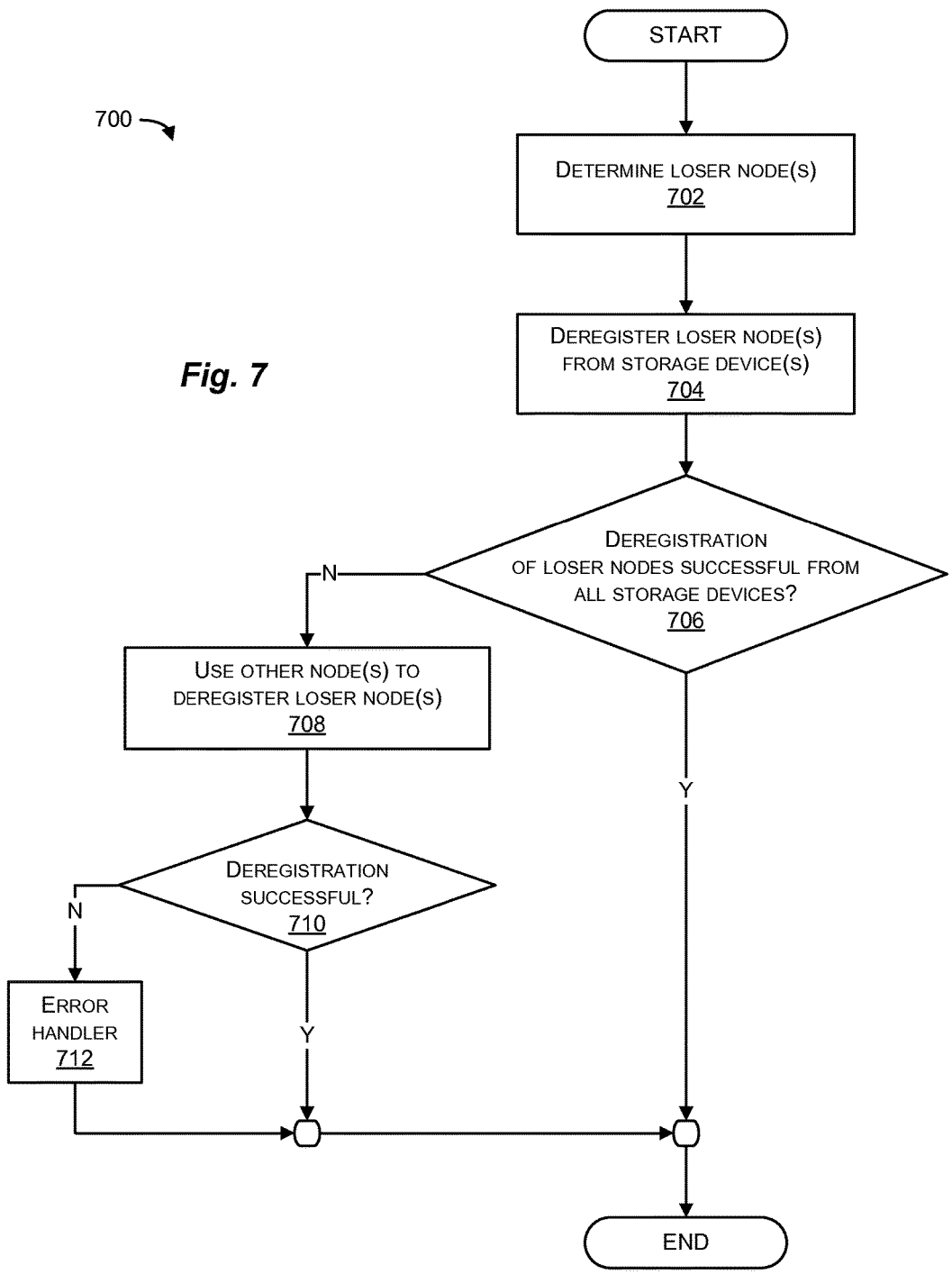
FIG. 7 is a flowchart of a method illustrating deregistering of node(s) as part of a fencing mechanism, according to some embodiments.

FIG. 7 is a flowchart of a method 700 illustrating processing of various I/O requests by node(s) as part of the fencing mechanism, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 700 is described with reference to variations of the elements described in connection with FIGS. 1, 3A, and 3B. In one embodiment, method 700 is executed by a control module, such as control module 116 and/or control module 310(1)-310(3). In one embodiment, method 700 is executed by a registration module 360 of control module 352. In one embodiment, method 600 is a detailed view of element 214.

In element 702, a control module determines the loser nodes(s), according to one embodiment. For example, the control module determines that node 302(1) is the loser node. A node can be determined to be a loser node with regard to a communication cluster as a result of arbitration, e.g., such as described with reference to method 500.

In element 704, the control module deregisters the loser node from the storage device(s) in the communication cluster, according to one embodiment. For example, the control module communicates with storage device 304(1) (e.g., with storage manager 318) and with storage device 304(2) to deregister loser node 302(1), such as by ejecting/deleting key 316(1) that corresponds to node 302(1). However, depending on implementation of the registration, other deregistering processes can be used instead. The control module communicates with other storage devices in the cluster to deregister the loser node. In one implementation, the control module can attempt such communication with each storage device multiple times. In one implementation, the control module only deregisters a node that is no longer in the communication cluster. For example, a node that is still in the communication cluster, but has lost device access (due to potential race condition between fencing and re-registering when storage connectivity is restored) is not de-registered.

In element 706, the control module determines whether the deregistering process is successful with respect to the storage device(s) accessible to the nodes in the cluster, according to one embodiment. For example, the control module determines whether deregistering is successful with regard to storage device 304(1) and the other storage device(s) (such as storage device 304(2)). In another embodiment, storage devices provide functionality to deregister keys across multiple storage devices using a single instruction/message. By using such as a single instruction/message, deregistering can be performed atomically rather than sequentially. If the deregistering is successful, method 700 ends. If the deregistering is not successful, element 708 is performed next.

In element 708, the control module uses one or more other node(s) in the communication cluster to deregister the loser node(s) with the storage devices, according to one embodiment. The control module can use the connectivity information to choose the correct node to de-register. The control module can use the other node(s) to communicate with storage devices that are not accessible in element 704. For example, the control module can communicate with node 302(3) (and/or other nodes) in order to deregister node 302(1) with storage device 304(2).

In element 710, the control module determines whether the deregistering process using the other nodes is successful for all of the storage device(s) in the communication cluster, according to one embodiment. For example, the control module can determine whether the deregistering is successful with regard to the remaining storage device 304(2). If the deregistering is successful, method 700 ends. If the deregistering is not successful, element 712 is performed next. In element 712, the control module performs an error handler, according to one embodiment. The error handler may include using a new storage device instead of storage device 304(2), as no node in the communication cluster can successfully communicate with storage device 304(2).

Figure 8:
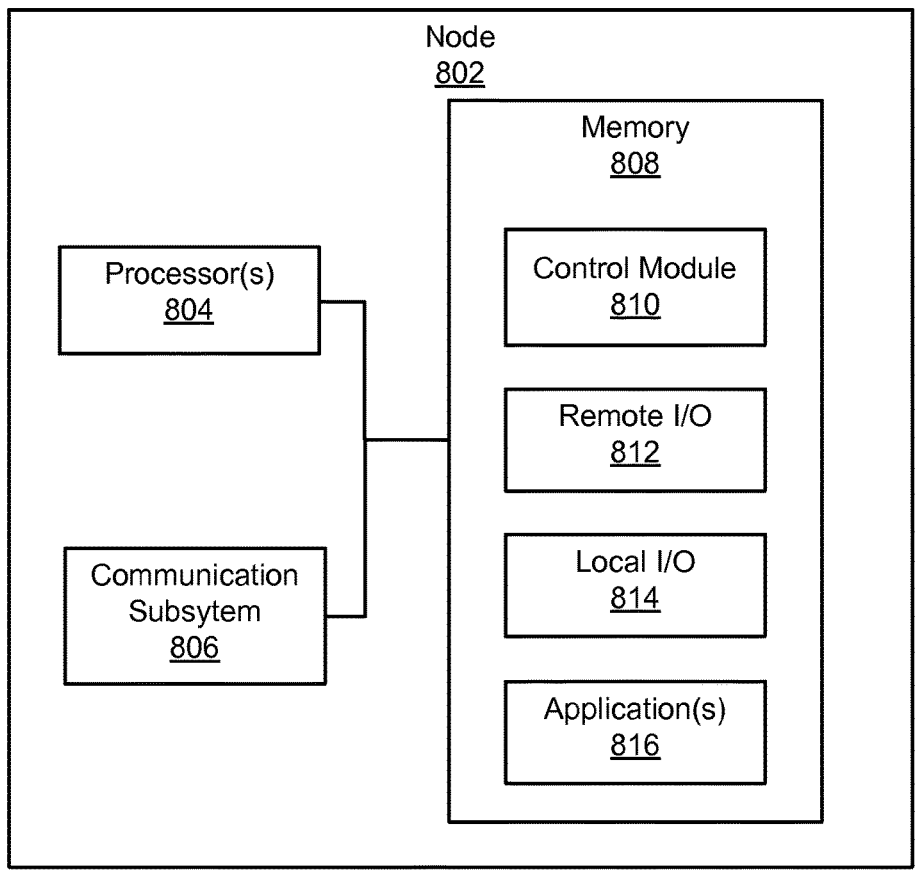
FIG. 8 is a block diagram illustrating an example node of a distributed storage system, according to one embodiment.

FIG. 8 is a block diagram 800 illustrating an example node of a distributed storage system, according to one embodiment. Node 802, which can implement node 104(1)-104(N), node 112(1)-112(N), and/or node 302(1)-302(3), includes a processor 804, communication subsystem 806, and a memory 808. Memory 808 includes an operating system (not shown), control module 810, remote I/O 812, local I/O 814, and one or more applications 816. It is noted that one or more of element(s) of control module 810 may be implemented as a software and/or hardware module. It is also noted that in some embodiments one or more of elements of node 802 may not be used. Processor(s) 804 executes one or more elements of control module 810. Control module 810 can be an implementation of control module 116, control module 310(1)-310(3), and/or control module 352, and can implement at least portions of methods 200, 400, 500, 600, and/or 700. Remote I/O can implement I/O requests that are received by a proxy node from another node, such as I/O requests 308(1)-308(M) received from node 302(1). Local I/O can implement I/O requests that are generated and then issued by the same node, such as I/O requests 306(1)-306(N) generated by node 302(2). Application(s) 816 can be instance(s) of parallel applications executing by nodes of a cluster.

Figure 9:
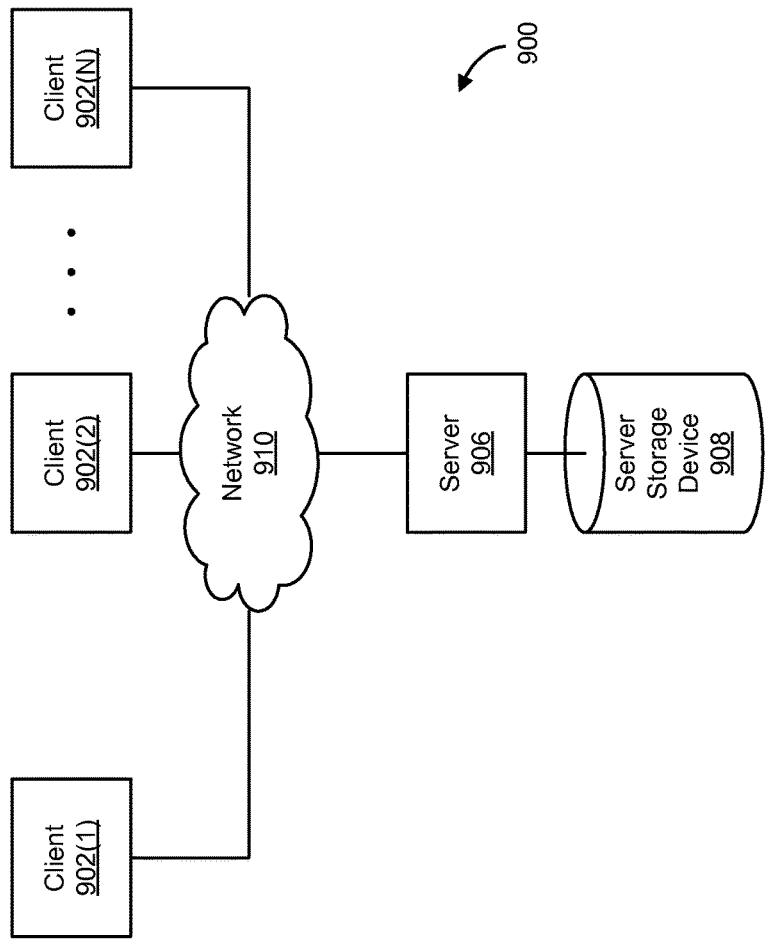
FIG. 9 is a block diagram illustrating a network architecture in which embodiments of the present application can be implemented.

Elements of network architecture can be implemented using different computer systems and networks. An example of one such network environment is described below with reference to FIG. 9. FIG. 9 is a simplified block diagram illustrating a network architecture 900 in which one or more clients are provided with access to a server via various network connections. As depicted in FIG. 9, clients 902(1)-(N) are coupled to a network 910, and so are able to access a server 906 (which can be used to implement node(s) of FIGS. 1, 2, and/or 9A) via network 910. Other servers (not shown) can be used instead to implement node(s) of FIGS. 1, 2, and/or 11A). A client can be implemented using, for example, a desktop computer, a laptop computer, a workstation, a server, a cell phone, a smart phone, a network-enabled personal digital assistant (PDA), or the like. An example of network 910, which can be used by clients 902(1)-(N) to access server 906, is the Internet. Alternatively, access to server 906 can be provided by a local area network (LAN) utilizing Ethernet, IEEE 802.11x, or some other communications protocol. As will be appreciated, server 906 can be accessed by clients coupled directly thereto (not shown).

As also depicted on FIG. 9, server 906 is coupled to a server storage device 908, which includes a data volume such as storage devices 106(1)-106(M), storage devices 114(1)-114(P), and/or storage devices 304(1)-304(2), among others. Server storage device 908 can be implemented as a single storage device or a collection of storage devices. Server storage device 908 can also be implemented as a storage area network, which couples remote storage devices to a server (e.g., server 906), such that the remote storage devices appear as locally-attached storage devices to the server's OS, for example.

In light of the present disclosure, those of skill in the art will appreciate that server storage device 908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 900 can include other components such as routers, firewalls and the like that are not germane to the discussion of the present network and will not be discussed further herein. Those of skill in the art will also appreciate that other configurations are possible. For example, clients 902(1)-(N) can be directly coupled to server storage device 908 without the user of a server or Internet; server 906 can be used to implement both the clients and the server; network architecture 900 can be implemented without the use of clients 902(1)-(N); and so on. As an example implementation of network architecture 900, server 906, services requests to data generated by clients 902(1)-(N) to data stored in server storage device 908. Any of the functionality of the nodes and/or modules can be implemented using one of such clients.

Figure 10:
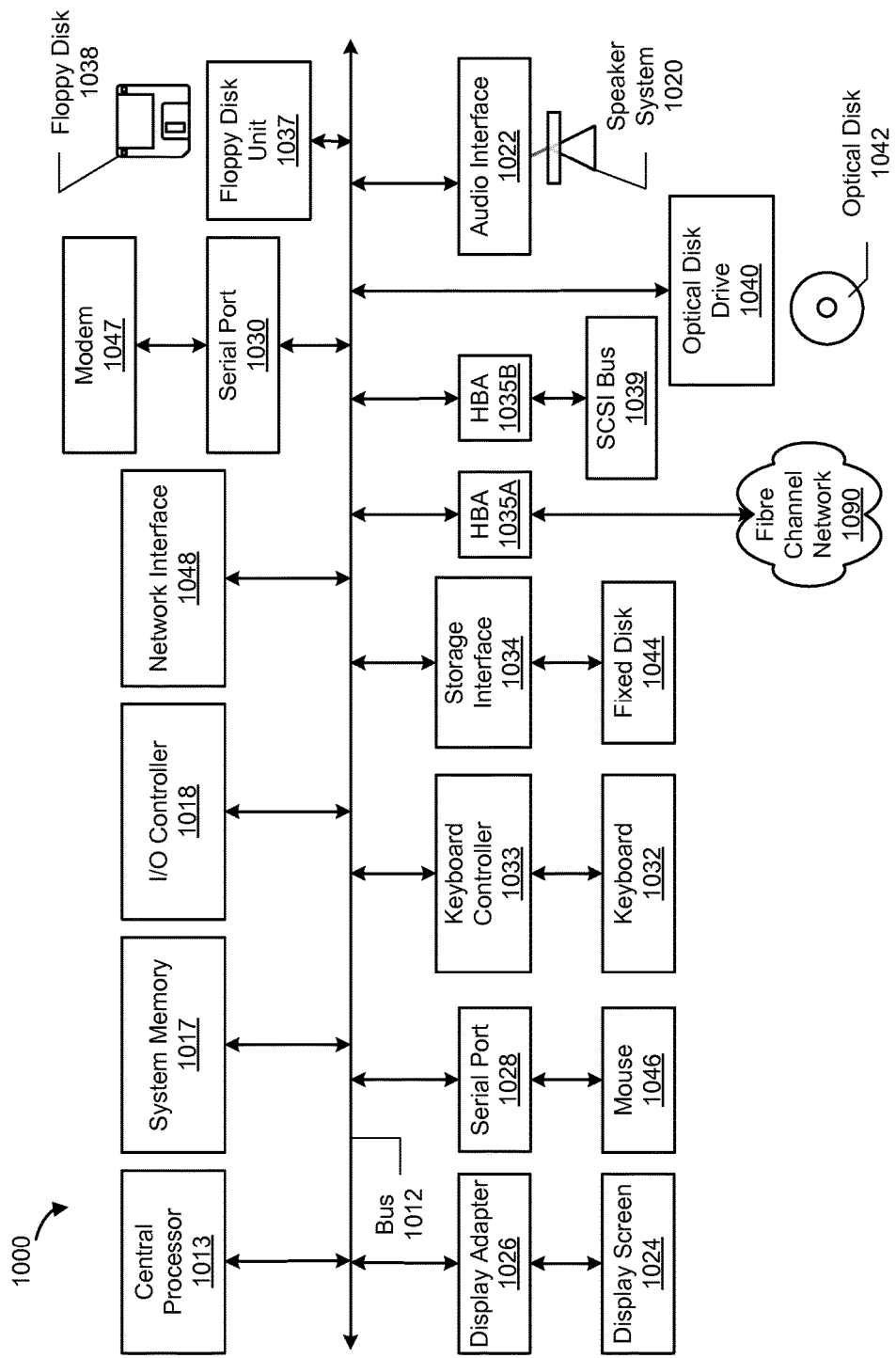
FIG. 10 is a block diagram that illustrates an example of a computer system suitable for implementing embodiments of the present application.

FIG. 10 depicts a block diagram of a computer system 1000 suitable for implementing the present disclosure. Computer system 1000 may be illustrative of various computer systems in the networked system of FIG. 1, such as node(s) and/or coordinator node(s), among others. Computer system 1000 includes a bus 1012 which interconnects major subsystems of computer system 1000, such as a central processor 1013, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1013 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1000 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1000, can connect to a standard computer readable medium for storage and/or retrieval of information, such as a fixed disk drive 1044. Fixed disk drive 1044 may be a part of computer system 1000 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for performing fencing operations in multi-node distributed storage systems (such as described above with reference to the methods of FIGS. 2, and/or 4-7, as well as functionality described with reference to FIGS. 3A, 3B, and/or 8), etc., to implement the present disclosure can be stored in computer-readable storage media such as one or more of system memory 1017, fixed disk 1044, optical disk 1042, or floppy disk 1038. Memory 1020 is also used for storing temporary variables or other intermediate information during the execution of instructions by the processor 1013. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   detecting a communication fault between a first node and a second node, wherein
      the first node and the second node each issue one or more input/output (I/O) requests to a storage device;
   performing an arbitration process to determine to which of a winner node group or a loser node group the first node and the second node belong, respectively; and
   if as a result of the arbitration process, either of the first node or the second is determined to be a node in the loser node group, fencing the node from the storage device by performing a fencing operation, wherein
      the fencing operation prevents the node from communicating with the storage device.

2. The computer-implemented method of claim 1, wherein
   the arbitration process is performed by the first node and the second node.

3. The computer-implemented method of claim 2, further comprising:
   if the arbitration process is successful, performing the fencing operation; and
   if the arbitration process is unsuccessful, retrying the arbitration process using one or more other nodes.

4. The computer-implemented method of claim 1, wherein
   the fencing operation further comprises instructing the storage device to not accept any communication from the node.

5. The computer-implemented method of claim 1, wherein
   the node uses a proxy node to issue the one or more I/O requests to the storage device.

6. The computer-implemented method of claim 5, wherein
   the proxy node is part of the winner node group, and as a result of the fencing operation, the proxy node is prevented from processing the one or more I/O requests.

7. The computer-implemented method of claim 1, further comprising:
   de-registering the node with the storage device.

8. The computer-implemented method of claim 7, wherein
   the de-registering comprises deleting a key of the node from the storage device.

9. The computer-implemented method of claim 1, further comprising:
   detecting a network partition prior to performing the arbitration process.

10. A system comprising:
    one or more processors; and
    a control module configured to be executed using the one or more processors to detect a communication fault between a first node and a second node, wherein
       the first node and the second node each issue one or more input/output (I/O) requests to a storage device;
    perform an arbitration process to determine to which of a winner node group or a loser node group the first node and the second node belong, respectively; and
    if as a result of the arbitration process, either of the first node or the second is determined to be a node in the loser node group, fence the node from the storage device by performing a fencing operation, wherein
       the fencing operation prevents the node from communicating with the storage device.

11. The system of claim 10, wherein
    the arbitration process is performed by the first node and the second node, and
    a network partition is detected prior to performing the arbitration process.

12. The system of claim 11, further comprising:
    if the arbitration process is successful, performing the fencing operation; and
    if the arbitration process is unsuccessful, retrying the arbitration process using one or more other nodes.

13. The system of claim 10, wherein
    the fencing operation further comprises instructing the storage device to not accept any communication from the node.

14. The system of claim 10, wherein
    the node uses a proxy node to issue the one or more I/O requests to the storage device,
    the proxy node is part of the winner node group, and
    as a result of the fencing operation, the proxy node is prevented from processing the one or more I/O requests.

15. The system of claim 10, further comprising:
    de-registering the node with the storage device, wherein
       the de-registering comprises deleting a key of the node from the storage device.

16. A non-transitory computer readable storage medium storing program instructions executable to:
    detect a communication fault between a first node and a second node, wherein
       the first node and the second node each issue one or more input/output (I/O) requests to a storage device;
    perform an arbitration process to determine to which of a winner node group or a loser node group the first node and the second node belong, respectively; and
    if as a result of the arbitration process, either of the first node or the second is determined to be a node in the loser node group, fence the node from the storage device by performing a fencing operation, wherein the fencing operation prevents the node from communicating with the storage device.

17. The non-transitory computer readable storage medium of claim 16, wherein
the arbitration process is performed by the first node and the second node, and
a network partition is detected prior to performing the arbitration process.

18. The non-transitory computer readable storage medium of claim 17, further comprising:
if the arbitration process is successful, performing the fencing operation; and
if the arbitration process is unsuccessful, retrying the arbitration process using one or more other nodes.

19. The non-transitory computer readable storage medium of claim 16, wherein
the node uses a proxy node to issue the one or more I/O requests to the storage device,
the proxy node is part of the winner node group, and
as a result of the fencing operation, the proxy node is prevented from processing the one or more I/O requests.

20. The non-transitory computer readable storage medium of claim 16, further comprising: de-registering the node with the storage device, wherein
the de-registering comprises deleting a key of the node from the storage device; and
instructing the storage device to not accept any communication from the node.

* * * * *